US011405952B2

(12) United States Patent
Shah et al.

(10) Patent No.: US 11,405,952 B2
(45) Date of Patent: Aug. 2, 2022

(54) USER EQUIPMENT AND BASE STATION FOR IMPROVED PRIORITIZED RANDOM ACCESS

(71) Applicant: Panasonic Intellectual Property Corporation of America, Torrance, CA (US)

(72) Inventors: Rikin Shah, Langen (DE); Ankit Bhamri, Langen (DE); Ming-Hung Tao, Langen (DE); Hidetoshi Suzuki, Kanagawa (JP); Sivapathalingham Sivavakeesar, Langen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 100 days.

(21) Appl. No.: 16/991,384

(22) Filed: Aug. 12, 2020

(65) Prior Publication Data

US 2020/0374926 A1  Nov. 26, 2020

Related U.S. Application Data

(63) Continuation of application No. PCT/EP2018/084740, filed on Dec. 13, 2018.

(30) Foreign Application Priority Data

Feb. 15, 2018  (EP) .................................. 18157036

(51) Int. Cl.
*H04W 74/00* (2009.01)
*H04W 24/10* (2009.01)
(Continued)

(52) U.S. Cl.
CPC ........ *H04W 74/008* (2013.01); *H04B 7/0626* (2013.01); *H04W 24/10* (2013.01);
(Continued)

(58) Field of Classification Search
CPC combination set(s) only.
See application file for complete search history.

(56) References Cited

U.S. PATENT DOCUMENTS 6,760,598 B1 * 7/2004 Kurjenniemi ......... H04W 52/04
370/318
2010/0309877 A1  12/2010 Damnjanovic et al.
(Continued)

FOREIGN PATENT DOCUMENTS

CN      107431883 A    12/2017
WO      2017/052144    3/2017

OTHER PUBLICATIONS

3GPP TS 38.321 V15.0.0, Dec. 2017, "3rd Generation Partnership Project; Technical Specification Group Radio Access Network; NR; Medium Access Control (MAC) protocol specification" (Year: 2017).*

(Continued)

*Primary Examiner* — James P Duffy
(74) *Attorney, Agent, or Firm* — Seed IP Law Group LLP

(57) ABSTRACT

A user equipment receives random access configuration parameters from its base station. A processor of the UE controls to repeatedly perform a prioritized RACH procedure with the base station, based on the received parameters, for a time period up to an end of a primary time interval or until a maximum number of RACH procedures is reached or until successful completion of the prioritized RACH procedure with the base station. The primary time interval comprises a plurality of secondary time intervals. The processor, when controlling to repeatedly perform the prioritized RACH procedure, determines random access parameters, which are valid for the duration of the respective secondary time interval in which the respective prioritized RACH procedure is performed, based on the received random access configuration parameters and depending on the
(Continued)

respective secondary time interval. A transmitter transmits messages of the respective prioritized RACH procedure using the determined valid random access parameters.

13 Claims, 9 Drawing Sheets

(51) Int. Cl.
    *H04W 52/36* (2009.01)
    *H04W 72/04* (2009.01)
    *H04W 74/08* (2009.01)
    *H04B 7/06* (2006.01)
(52) U.S. Cl.
    CPC ..... *H04W 52/362* (2013.01); *H04W 72/0446* (2013.01); *H04W 74/0833* (2013.01)

(56) References Cited

U.S. PATENT DOCUMENTS

| | | | |
|---|---|---|---|
| 2011/0299415 | A1 | 12/2011 | He et al. |
| 2012/0275305 | A1* | 11/2012 | Lin .................. H04W 74/0841 370/235 |
| 2013/0329631 | A1 | 12/2013 | Alam et al. |
| 2016/0262109 | A1 | 9/2016 | Chen et al. |

OTHER PUBLICATIONS

3GPP TR 38.801 V14.0.0, "3rd Generation Partnership Project; Technical Specification Group Radio Access Network; Study on new radio access technology: Radio access architecture and interfaces (Release 14)," Mar. 2017, 91 pages.

3GPP TR 38.804 V14.0.0, "3rd Generation Partnership Project; Technical Specification Group Radio Access Network; Study on New Radio Access Technology; Radio Interface Protocol Aspects (Release 14)," Mar. 2017, 57 pages.

3GPP TR 38.913 V14.3.0, "3rd Generation Partnership Project; Technical Specification Group Radio Access Network; Study on Scenarios and Requirements for Next Generation Access Technologies; (Release 14)," Jun. 2017, 39 pages.

3GPP TS 36.321 V14.1.0, "$3^{rd}$ Generation Partnership Project; Technical Specification Group Radio Access Network; Evolved Universal Terrestrial Radio Access (E-UTRA); Medium Access Control (MAC) protocol specification (Release 14)," Dec. 2016, 98 pages.

3GPP TS 36.321 V14.3.0, "3rd Generation Partnership Project; Technical Specification Group Radio Access Network; Evolved Universal Terrestrial Radio Access (E-UTRA); Medium Access Control (MAC) protocol specification (Release 14)," Jun. 2017, 107 pages.

3GPP TS 36.331 V15.0.1, "3rd Generation Partnership Project; Technical Specification Group Radio Access Network; Evolved Universal Terrestrial Radio Access (E-UTRA); Radio Resource Control (RRC); Protocol specification (Release 15)," Jan. 2018, 776 pages.

3GPP TS 38.211 V15.0.0, "$3^{rd}$ Generation Partnership Project; Technical Specification Group Radio Access Network; NR; Physical channels and modulation (Release 15)," Dec. 2017, 73 pages.

3GPP TS 38.214 V15.0.0, "$3^{rd}$ Generation Partnership Project; Technical Specification Group Radio Access Network; NR; Physical layer procedures for data (Release 15)," Dec. 2017, 71 pages.

3GPP TS 38.300 V15.0.0, "$3^{rd}$ Generation Partnership Project; Technical Specification Group Radio Access Network; NR; NR and NG-RAN Overall Description; Stage 2 (Release 15)," Dec. 2017, 68 pages.

3GPP TS 38.321 V15.0.0, "$3^{rd}$ Generation Partnership Project; Technical Specification Group Radio Access Network; NR; Medium Access Control (MAC) protocol specification (Release 15)," Dec. 2017, 55 pages.

Extended European Search Report, dated Jul. 23, 2018, for European Application No. 18157036.7-1215, 9 pages.

International Search Report, dated Feb. 18, 2019, for International Application No. PCT/EP2018/084740, 2 pages.

Chinese Office Action, dated Nov. 29, 2021, for Chinese Application No. 201880089437.3 (21 pages). (with English translation).

* cited by examiner

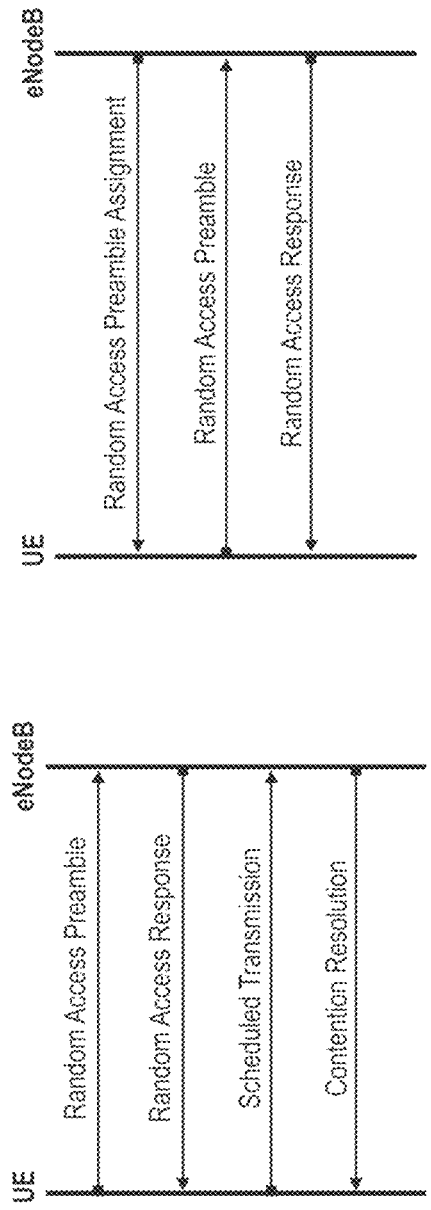
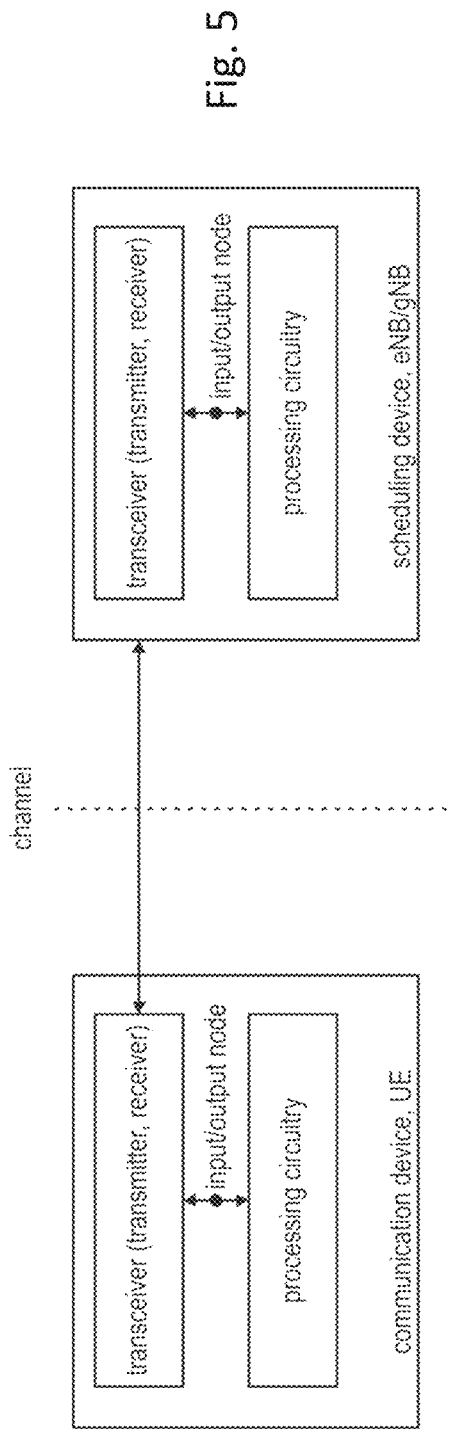

USER EQUIPMENT AND BASE STATION FOR IMPROVED PRIORITIZED RANDOM ACCESS

BACKGROUND

Technical Field

The present disclosure is directed to methods, devices and articles in communication systems, such as 3GPP communication systems.

Description of the Related Art

Currently, the 3rd Generation Partnership Project (3GPP) works at the next release (Release 15) of technical specifications for the next generation cellular technology, which is also called fifth generation (5G). At the 3GPP Technical Specification Group (TSG) Radio Access network (RAN) meeting #71 (Gothenburg, March 2016), the first 5G study item, "Study on New Radio Access Technology" involving RAN1, RAN2, RAN3 and RAN4 was approved and is expected to become the Release 15 work item that defines the first 5G standard. The aim of the study item is to develop a "New Radio (NR)" access technology (RAT), which operates in frequency ranges up to 100 GHz and supports a broad range of use cases, as defined during the RAN requirements study (see, e.g., 3GPP TR 38.913 "Study on Scenarios and Requirements for Next Generation Access Technologies", current version 14.3.0 available at www.3gpp.org and incorporated herein its entirety by reference).

One objective is to provide a single technical framework addressing all usage scenarios, requirements and deployment scenarios defined in TR 38.913, at least including enhanced mobile broadband (eMBB), ultra-reliable low-latency communications (URLLC), massive machine type communication (mMTC). For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC may include scenarios with large number of devices with non-time critical data transfers such as smart wearables and sensor networks. The services eMBB and URLLC are similar in that they both demand a very broad bandwidth, however are different in that the URLLC service requires ultra-low latencies.

A second objective is to achieve forward compatibility. Backward compatibility to Long Term Evolution (LTE, LTE-A) cellular systems is not required, which facilitates a completely new system design and/or the introduction of novel features.

The fundamental physical layer signal waveform will be based on OFDM, with potential support of a non-orthogonal waveform and multiple access. For instance, additional functionality on top of OFDM such as DFT-S-OFDM, and/or variants of DFT-S-OFDM, and/or filtering/windowing is further considered. In LTE, CP-based OFDM and DFT-S-OFDM are used as waveform for downlink and uplink transmission, respectively. One of the design targets in NR is to seek a common waveform as much as possible for downlink, uplink and sidelink.

Besides the waveform, some basic frame structure(s) and channel coding scheme(s) will be developed to achieve the above-mentioned objectives. The study shall also seek a common understanding on what is required in terms of radio protocol structure and architecture to achieve the above-mentioned objectives. Furthermore, the technical features which are necessary to enable the new RAT to meet the above-mentioned objectives shall be studied, including efficient multiplexing of traffic for different services and use cases on the same contiguous block of spectrum.

Existing cellular network architectures are relatively monolithic, with a transport network that facilitates mobile traffic to user devices. They may not be flexible enough to so support wider ranges of performance and scalability requirements.

Since the standardization for the NR of 5th Generation systems of 3GPP is at the very beginning, there are several issues that remain unclear, particularly with regard to effectively implement a prioritized random access procedure.

BRIEF SUMMARY

One non-limiting and exemplary embodiment facilitates providing an improved random-access procedure in which different entities (UE, gNB) are participating.

In one general first aspect, the techniques disclosed here feature a user equipment which comprises a receiver, a processor and the transmitter as follows. The receiver receives random access configuration parameters from a base station that controls a radio cell of a mobile communication system in which the user equipment is located. The processor controls to repeatedly perform a prioritized random access procedure with the base station, based on the received random access configuration parameters, for a time period up to an end of a primary time interval or until a maximum number of RACH procedures is reached or until successful completion of the prioritized random access procedure with the base station. The primary time interval comprises a plurality of secondary time intervals. The processor, when controlling to repeatedly perform the prioritized random access procedure, determines random access parameters, which are valid for the duration of the respective secondary time interval in which the respective at least one prioritized random access procedure is performed, based on the received random access configuration parameters and depending on the respective secondary time interval. The transmitter transmits messages of the respective prioritized random access procedure using the determined valid random access parameters.

In one general first aspect, the techniques disclosed here feature a base station that controls a radio cell of a mobile communication system in which a user equipment is located, wherein the base station comprises a receiver, a processor and a transmitter as follows. The receiver receives a channel state information, CSI, report and/or a measurement report from the user equipment. The processor determines, based on the received CSI report and/or the received measurement report, random access configuration parameters to be used by the user equipment for repeatedly performing a prioritized random access procedure with the base station within a primary time interval which comprises a plurality of secondary time intervals. The transmitter transmits the determined random access configuration parameters to the user equipment such that the user equipment is able to determine, based on the random access configuration parameters and depending on the respective secondary time interval, random access parameters, which are valid for the duration of the respective secondary time interval in which the respective at least one prioritized random access procedure is performed.

It should be noted that general or specific embodiments may be implemented as a system, a method, an integrated circuit, a computer program, a storage medium, or any selective combination thereof.

Additional benefits and advantages of the disclosed embodiments will be apparent from the specification and Figures. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following exemplary embodiments are described in more detail with reference to the attached figures and drawings:

FIG. 3 illustrates the messages exchanged between an eNB and a UE when performing a contention-based RACH procedure;

FIG. 4 illustrates the messages exchanged between an eNB and a UE when performing a contention-free RACH procedure;

FIG. 5 illustrates the exemplary and simplified structure of a UE and an eNB/gNB;

DETAILED DESCRIPTION

Basis of the Present Disclosure

5G NR System Architecture and Protocol Stacks

As presented in the background section, 3GPP is working at the next release for the 5th generation cellular technology, simply called 5G, including the development of a new radio access technology (NR) operating in frequencies ranging up to 100 GHz. 3GPP has to identify and develop the technology components needed for successfully standardizing the NR system timely satisfying both the urgent market needs and the more long-term requirements. In order to achieve this, evolutions of the radio interface as well as radio network architecture are considered in the study item "New Radio Access Technology". Results and agreements are collected in the Technical Report TR 38.804 v14.0.0, incorporated herein in its entirety by reference.

Figures 1, 2:
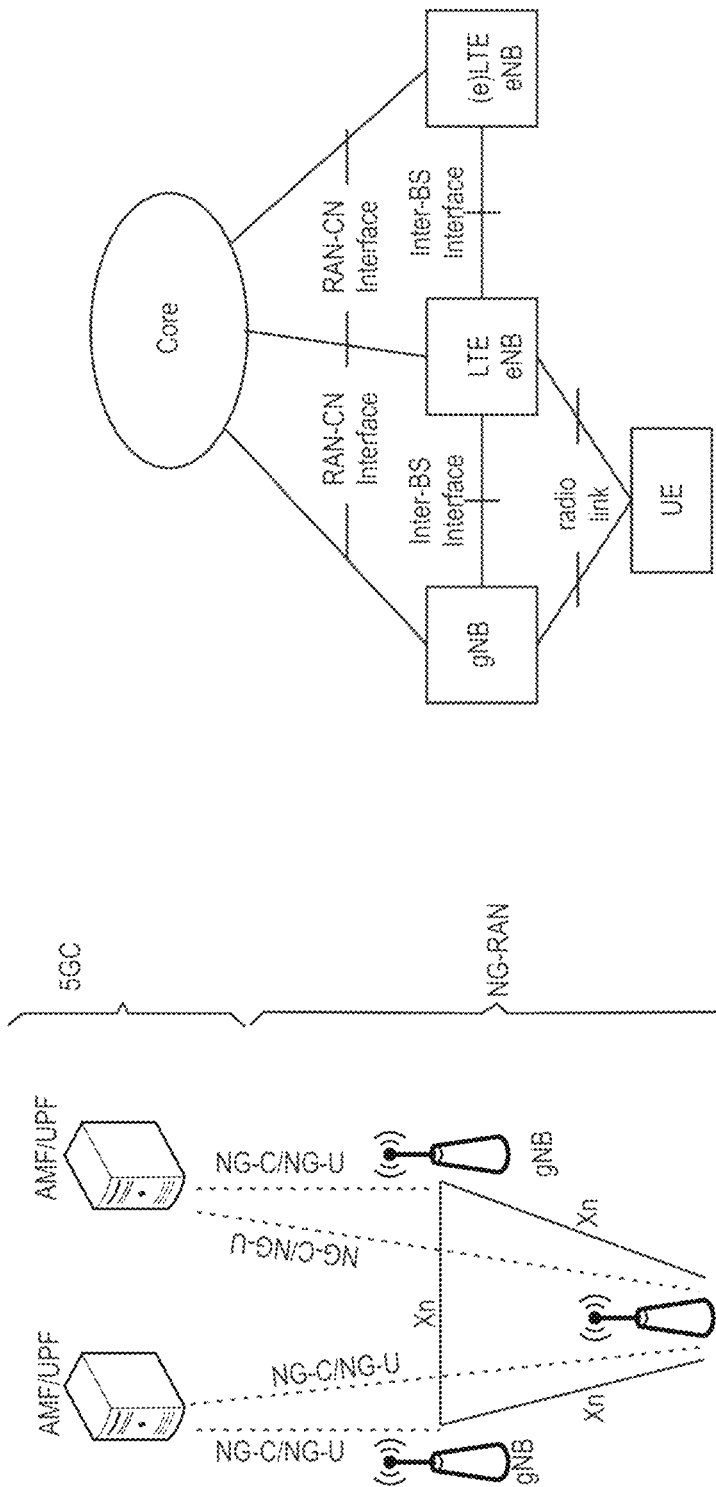
FIG. 1 shows an exemplary architecture for a 3GPP NR system.
FIG. 2 shows an exemplary user and control plane architecture for the LTE eNB, gNB, and UE.

Among other things, there has been a provisional agreement on the overall system architecture. The NG-RAN (Next Generation-Radio Access Network) consists of gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1, based on TS 38.300 v.15.0.0, section 4 incorporated herein by reference.

Various different deployment scenarios are currently being discussed for being supported, as reflected, e.g., in 3GPP TR 38.801 v14.0.0 incorporated herein by reference in its entirety. For instance, a non-centralized deployment scenario (section 5.2 of TR 38.801; a centralized deployment is illustrated in section 5.4) is presented therein, where base stations supporting the 5G NR can be deployed. FIG. 2 illustrates an exemplary non-centralized deployment scenario and is based on FIG. 5.2.-1 of said TR 38.801, while additionally illustrating an LTE eNB as well as a user equipment (UE) that is connected to both a gNB and an LTE eNB. As mentioned before, the new eNB for NR 5G may be exemplarily called gNB.

An eLTE eNB, as exemplarily defined in TR 38.801, is the evolution of an eNB that supports connectivity to the EPC (Evolved Packet Core) and the NGC (Next Generation Core).

The user plane protocol stack for NR is currently defined in TS 38.300 v15.0.0, section 4.4.1. The PDCP (Packet Data Convergence Protocol), RLC (Radio Link Control) and MAC (Medium Access Control) sublayers are terminated in the gNB on the network side. Additionally, a new access stratum (AS) sublayer (SDAP, Service Data Adaptation Protocol) is introduced above PDCP as described in sub-clause 6.5 of TS 38.300. The control plane protocol stack for NR is defined in TS 38.300, section 4.4.2. An overview of the Layer 2 functions is given in sub-clause 6 of TS 38.300. The functions of the PDCP, RLC and MAC sublayers are listed in respectively sub-clauses 6.4, 6.3, and 6.2 of TS 38.300. The functions of the RRC layer are listed in sub-clause 7 of TS 38.300. The mentioned sub-clauses of TS 38.300 are incorporated herein by reference.

The new NR layers exemplarily assumed for the 5G systems may be based on the user plane layer structure currently used in LTE(-A) communication systems.

As identified in TR 38.913, use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability (1-$10^{-5}$ within 1 ms). Finally, mMTC requires high connection density (1,000,000 devices/km$^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, number of symbols per scheduling interval) that is suitable for one use case might not work well for another. For example, low-latency services may require a shorter symbol duration (and thus larger subcarrier spacing) and/or fewer symbols per scheduling interval (aka, TTI) than an mMTC service. Furthermore, deployment scenarios with large channel delay spreads require a longer CP duration than scenarios with short delay spreads. The subcarrier spacing should be optimized accordingly to retain the similar CP overhead. In 3GPP RAN1 #84bis meeting (Busan, April 2016), it was agreed that it is necessary for NR to support more than one value of subcarrier spacing. Correspondingly, subcarrier spacing of 15 kHz, 30 kHz, 60 kHz ... are being considered at the moment. The symbol duration $T_u$ and the subcarrier spacing $\Delta f$ are directly related through the formula $\Delta f=1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain. Some definitions have already been achieved as apparent from 3GPP TS 38.211 v15.0.0 incorporated herein by reference.

Random Access Channel Procedure and Prioritized Random Access Procedure

No final agreement has been reached with regard to the RACH (Random Access Channel) procedure (or simply random access procedure) in 5G NR. As described in section 9.2 of TR 38.804 v14.0.0, incorporated herein by reference, the NR RACH procedure may support both contention-based and contention-free random access, in the same or similar manner as defined for LTE. Also, the design of the NR RACH procedure shall support a flexible message-3 size, similar as in LTE although its size might be quite limited.

The LTE RACH procedure will be described in the following in more detail, with reference to FIGS. 3 and 4. A mobile terminal in LTE can only be scheduled for uplink transmission, if its uplink transmission is time synchronized. Therefore, the Random Access Channel (RACH) procedure plays an important role as an interface between non-synchronized mobile terminals (UEs) and the orthogonal transmission of the uplink radio access. For instance, the Random Access in LTE is used to achieve uplink time synchronization for a user equipment which either has not yet acquired, or has lost, its uplink synchronization. Once a user equipment has achieved uplink synchronization, the eNodeB can schedule uplink transmission resources for it. One scenario relevant for random access is where a user equipment in RRC_CONNECTED state, handing over from its current serving cell to a new target cell, performs the Random Access Procedure in order to achieve uplink time-synchronization in the target cell.

LTE offers two types of random access procedures allowing access to be either contention based, i.e., implying an inherent risk of collision, or contention free (non-contention based). A detailed description of the LTE random access procedure can be also found in 3GPP TS 36.321, section 5.1. v14.1.0 incorporated herein by reference.

In the following the LTE contention-based random access procedure is being described in more detail with respect to FIG. 3. This procedure consists of four "steps". First, the user equipment transmits a random access preamble on the Physical Random Access Channel (PRACH) to the eNodeB (i.e., message 1 of the RACH procedure). After the eNodeB has detected a RACH preamble, it sends a Random Access Response (RAR) message (message 2 of the RACH procedure) on the PDSCH (Physical Downlink Shared Channel) addressed on the PDCCH with the (Random Access) RA-RNTI identifying the time-frequency slot in which the preamble was detected. If multiple user equipment transmitted the same RACH preamble in the same PRACH resource, which is also referred to as collision, they would receive the same random access response message. The RAR message may convey the detected RACH preamble, a timing alignment command (TA command) for synchronization of subsequent uplink transmissions, an initial uplink resource assignment (grant) for the transmission of the first scheduled transmission and an assignment of a Temporary Cell Radio Network Temporary Identifier (T-CRNTI). This T-CRNTI is used by eNodeB to address the mobile(s) whose RACH preamble was detected until the RACH procedure is finished, since the "real" identity of the mobile at this point is not yet known by the eNodeB.

The user equipment monitors the PDCCH for reception of the random access response message within a given time window (e.g., termed RAR time window), which is configured by the eNodeB. In response to the RAR message received from the eNodeB, the user equipment transmits the first scheduled uplink transmission on the radio resources assigned by the grant within the random access response. This scheduled uplink transmission conveys the actual random access procedure message like for example an RRC Connection Request, RRC Resume Request or a buffer status report.

In case of a preamble collision having occurred in the first message of the RACH procedure, i.e., multiple user equipment have sent the same preamble on the same PRACH resource, the colliding user equipment will receive the same T-CRNTI within the random access response and will also collide in the same uplink resources when transmitting their scheduled transmission in the third step of the RACH procedure. In case the scheduled transmission from one user equipment is successfully decoded by eNodeB, the contention remains unsolved for the other user equipment(s). For resolution of this type of contention, the eNode B sends a contention resolution message (a fourth message) addressed to the C-RNTI or Temporary C-RNTI. This concludes the procedure.

FIG. 4 is illustrating the contention-free random access procedure of 3GPP LTE, which is simplified in comparison to the contention-based random access procedure. The eNodeB provides in a first step the user equipment with the preamble to use for random access so that there is no risk of collisions, i.e., multiple user equipment transmitting the same preamble. Accordingly, the user equipment is subsequently sending the preamble which was signaled by eNodeB in the uplink on a PRACH resource. Since the case that multiple UEs are sending the same preamble is avoided for a contention-free random access, essentially, a contention-free random access procedure is finished after having successfully received the random access response by the UE.

A similar or same RACH procedure as just explained in connection with FIGS. 3 and 4 could be adopted in the future for the new radio technology of 5G. The current agreements on the random access procedure for 5G NR are captured in the 3GPP Technical Specification 38.321 v15.0.0, section 5.1 "Random Access Procedure" incorporated herein by reference.

Furthermore, 3GPP is also studying a two-step RACH procedure for 5G NR, where a message 1, that corresponds to messages 1 and 3 in the four-step RACH procedure, is transmitted at first. Then, the gNB will respond with a message 2, corresponding to messages 2 and 4 of the LTE RACH procedure. Due to the reduced message exchange, the latency of the two-step RACH procedure may be reduced compared to the four-step RACH procedure. The radio resources for the messages are optionally configured by the network.

Moreover, 3GPP has generally agreed that NR communication systems should support prioritization of the random access, however without agreeing on the details on how this can be achieved in detail.

In contrast, in LTE systems the UEs perform basically the same random access procedure with the same set of configured parameters, e.g., a common back-off value, a common power ramping parameter and the radio resources for the PRACH (Physical Random Access Channel). Thus, a UE performs the random access procedure without any consideration of the purpose of the access request, i.e., why the random access procedure is performed in the first place.

In contrast thereto, prioritization of the random access procedure of different UEs is motivated by the need to support a broader set of service requirements in future NR systems and also by the desire to improve the robustness of the system. In more detail, different user services currently handled by the UE can also benefit from the random access prioritization. For instance, random access triggered for the URLLC service would benefit from having a fast access with a lower delay than needed for random access procedure triggered in the context of an eMBB service.

Further, different types of random access events have different access delay requirements, such that random access requests triggered in the UE by certain random access (RA) events should have higher priority than others. For instance, an RA event that is triggered by an RRC Connection Re-establishment should be handled with a shorter delay, than, e.g., an RA event triggered by a UE trying to get initial access. Similarly, a UE in RRC_Connected state trying to use the random access procedure to get synchronized again could be given a higher priority than, e.g., a UE in RRC_Idle trying to use random access to get initial access.

The following random access events are currently defined:
(Event 1): Initial access from RRC_IDLE
(Event 2): RRC Connection Re-establishment procedure
(Event 3): Handover
(Event 4): DL data arrival during RRC_CONNECTED requiring random access procedure, e.g., when UL synchronisation status is "non-synchronized"
(Event 5): UL data arrival during RRC_CONNECTED requiring random access procedure, e.g., when UL synchronisation status is "non-synchronized" or there are no PUCCH resources for SR available
(Event 6): Transition from RRC_INACTIVE to RRC_CONNECTED
(Event 7): Beam Recovery Events 1 to 6 that trigger a random access procedure are already known from LTE system, whereas Event 7 (beam recovery) is currently being discussed to be newly introduced for 5G NR systems.

There have been recent agreements in that UE will apply a prioritized RACH procedure (if configured) for events 3 and 7, i.e., for handovers using contention-based access and for contention based beam failure recovery. The set of parameters for prioritization may include the power ramping step as well as the back-off parameter. The back-off parameter is used to determine the time a UE has to wait before transmitting another preamble, i.e., allows controlling a delay between two subsequent preamble transmissions. For instance, in case a collision with another UE occurs, the UE has to back-off for a certain time period before transmitting the next preamble. Prioritization via the back-off parameter allows, e.g., adapting the preamble transmission delay so as to mitigate congestion.

Transmission of the preamble involves a power ramping function, according to which the transmission power with which the preamble is transmitted by the UE is successively increased with each failed preamble transmission attempt. An initial preamble power parameter as well as a power ramping step parameter is provided in said respect, the latter one defining the power increase of each power ramping instance. Prioritization via the power ramping parameters allows to overcome uplink interference, mainly for the preamble transmission of the random access procedure, thus increasing the possibility of a successful preamble transmission which may reduce the overall time delay for the random access procedure.

In connection with signaling parameters for a prioritized random access procedure, there are currently two options under discussion. As one option, it is discussed to use system information as it is known from LTE systems. However, since the system information is broadcast, there is the problem of the increased overhead, since the network will need to inform each UE about the configuration parameters for prioritized random access procedure, such as power ramping step value and back-off values. As a further option, dedicated RRC signaling is discussed to be used for informing the UEs about the configuration parameters of prioritized random access procedure. However, this option requires to control the usage of radio resources during a prioritized random access procedure so that there is no significant congestion or interference with other UEs.

It is also an issue of how to handle the duration of a prioritized random access procedure as well as how to handle the configuration of power ramping and back-off parameters during the prioritized random access procedure.

Hence, there is the need for improving the handling of the prioritized random access procedure as well as the configuration of power ramping and back-off parameters as well as the efficient resource usage during prioritized random access procedure.

DETAILED DESCRIPTION OF PRESENT DISCLOSURE

In the following, UEs, base stations, and procedures to meet these needs will be described for the new radio access technology envisioned for the 5G mobile communication systems. Different implementations and variants will be explained as well. The following detailed disclosure was facilitated by the discussions and findings as described in the previous section "Basis of the present disclosure" and may for example be based at least on part thereof.

In general, it should be however noted that only some things have been actually agreed on with regard to the 5G cellular communication system such that many assumptions have to be made in the following so as to be able to explain the principles underlying the present disclosure in a clear and understandable manner. These assumptions are however to be understood as merely examples that should not limit the scope of the disclosure. A skilled person will be aware that the principles of the following disclosure and as laid out in the claims can be applied to different scenarios and in ways that are not explicitly described herein.

Moreover, some of the terms of the procedures, entities, layers, etc., used in the following are closely related to LTE/LTE-A systems or to terminology used in the current study items for 3GPP 5G, even though specific terminology to be used in the context of the new radio access technology for the next 3GPP 5G communication systems is not fully decided yet. Thus, terms could be changed in the 3GPP normative phase, without affecting the functioning of the embodiments of the disclosure. Consequently, a skilled person is aware that the disclosure and its scope of protection should not be restricted to particular terms exemplarily used herein for lack of newer or finally agreed terminology but should be more broadly understood in terms of functions and concepts that underlie the functioning and principles of the present disclosure.

For instance, a mobile station or mobile node or user terminal or user equipment (UE) is a physical entity (physical node) within a communication network. One node may have several functional entities. A functional entity refers to a software or hardware module that implements and/or offers a predetermined set of functions to other functional entities of the same or another node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "base station" or "radio base station" here refers to a physical entity within a communication network. As with the mobile station, the base station may have several functional entities. A functional entity refers to a software or hardware module that implements and/or offers a predetermined set of functions to other functional entities of the same or another node or the network. The physical entity performs some control tasks with respect to the communication device, including one or more of scheduling and configuration. It is noted that the base station functionality and the communication device functionality may be also integrated within a single device. For instance, a mobile terminal may implement also functionality of a base station for other terminals. The terminology used in LTE is eNB (or eNodeB), while the currently-used terminology for 5G NR is gNB.

The term "primary time interval" refers a limited time interval, so as to restrict the time duration for which the UE repeatedly performs prioritized random access procedures. Even, if none of the prioritized random access procedures was successful during the specific primary time interval, no further random access attempts are made. Otherwise, if the UE successfully completes a prioritized random access procedure within the specific primary time interval, no further random access attempts are needed within the remaining time of the specific primary time interval.

The term "secondary time interval" refers to one of a plurality of time intervals, which are comprised in the primary time interval. In other words, the primary time interval comprises a subset of secondary time intervals. As will be explained in detail for the embodiment, for each secondary time interval, specific random access parameters are valid. Thereby, the transition from one secondary time interval to the subsequent secondary time interval could also be exemplarily considered as a "checkpoint", whereafter new random access parameters are valid.

FIG. 5 illustrates a general, simplified and exemplary block diagram of a user equipment (also termed communication device) and a scheduling device (here exemplarily assumed to be located in the base station, e.g., the eLTE eNB (alternatively termed ng-eNB) or the gNB in 5G NR). The UE and eNB/gNB are communicating with each other over a (wireless) physical channel respectively using the transceiver.

The communication device may comprise a transceiver and processing circuitry. The transceiver in turn may comprise a receiver and a transmitter. The processing circuitry may be one or more pieces of hardware such as one or more processors or any LSIs. Between the transceiver and the processing circuitry there is an input/output point (or node) over which the processing circuitry, when in operation, can control the transceiver, i.e., control the receiver and/or the transmitter and exchange reception/transmission data. The transceiver may include the RF (radio frequency) front including one or more antennas, amplifiers, RF modulators/demodulators and the like. The processing circuitry may implement control tasks such as controlling the transceiver to transmit user data and control data provided by the processing circuitry and/or receive user data and control data which is further processed by the processing circuitry. The processing circuitry may also be responsible for performing processes of determining, deciding, calculating, measuring, etc. The transmitter may be responsible for performing the process of transmitting and other processes related thereto. The receiver may be responsible for performing the process of receiving and other processes related thereto.

In the present case as will become apparent from the below description of the different embodiments and variants thereof, the processor can thus be exemplarily configured to control the transition between the different states the UE can be in, e.g., from RRC Inactive to RRC Connected or vice versa, or from/to RRC Idle. Another example refers to the processor determining whether and how to perform the random access procedure, including the determination of the random access parameters to be used.

The transmitter in turn can be configured to be able to transmit the messages of the RACH procedure. Conversely, a receiver can in turn be configured to be able to receive messages of the RACH procedure, paging messages from the base stations, as well as system information broadcast by the base station.

Embodiment 1

An improved priority random access procedure will be described in the following according to numerous variants of a first embodiment.

Prioritization of the random access procedure in this respect is to be understood for instance in that the back-off time value and/or the transmit power value to be used by the UE for the random access procedure can be adapted to better reflect the priority (and thus facilitate meeting certain requirements) imposed, e.g., by the UE or by the random access event triggering the random access. The back-off parameter, which is also referred to as back-off value in the following, is a parameter used to determine the period of time the UE has to wait between a previous (possibly unsuccessful) random access procedure and the start of a new random access procedure (by transmitting the first random access message with the preamble). The back-off parameter is for example provided by the gNB to the UE and can be used, e.g., in case a collision is detected in the gNB, i.e., several UEs transmitted the same preamble using the same PRACH resources to the gNB. The back-off parameter is already known in LTE, e.g., in TS 36.321 v14.3.0 in corresponding sections 5.1.4 and 7.2, incorporated herein by reference. The transmit power value indicates a value on which basis the UE determines with how much power it can transmit the first random access message of the random access procedure to the gNB, thus influencing the robustness of the scheduled transmission itself and also the chances of success in case of colliding RACH procedures between several UEs.

Consequently, prioritization of the random access procedure is particularly helpful in cases where collisions between different UEs using the same random access resources occur. The gNB, in those instances where it identifies collisions between random access procedures performed by different UEs, may prioritize the further performance of the random access procedures of the different UEs by selecting the appropriate back-off parameter and assigning same to the different UEs.

According to this embodiment, the UE participates in the prioritization of the random access procedures wherein it is assumed that, at both the UE-side and the gNB-side, random access configuration information is available, associating specific PRACH resources (also termed random access configuration parameters) with specific prioritization criteria (e.g., circumstances on which basis the random access should be prioritized).

For example, the random access configuration parameters may include one or more of the following:
- a random access preamble sequence, transmitted with the random access message;
- time and frequency of the radio channel resources that are to be used by the UE when transmitting the random access preamble message to the gNB;
- an initial transmit power value, to be used by the UE when transmitting the initial random access preamble message to the gNB during a random access attempt;
- one or a plurality of power ramping step size values each indicating a power increment to the previously-used transmit power value to determine a new transmit power to be used for a subsequent prioritized random access procedure performed within a secondary time interval;
- a single back-off value indicating a waiting time between two subsequent prioritized random access procedures, which is applicable to all secondary time intervals; and
- multiple back-off values each indicating the respective waiting time between two subsequent prioritized random access procedures within the respective secondary time interval.

Figure 6:
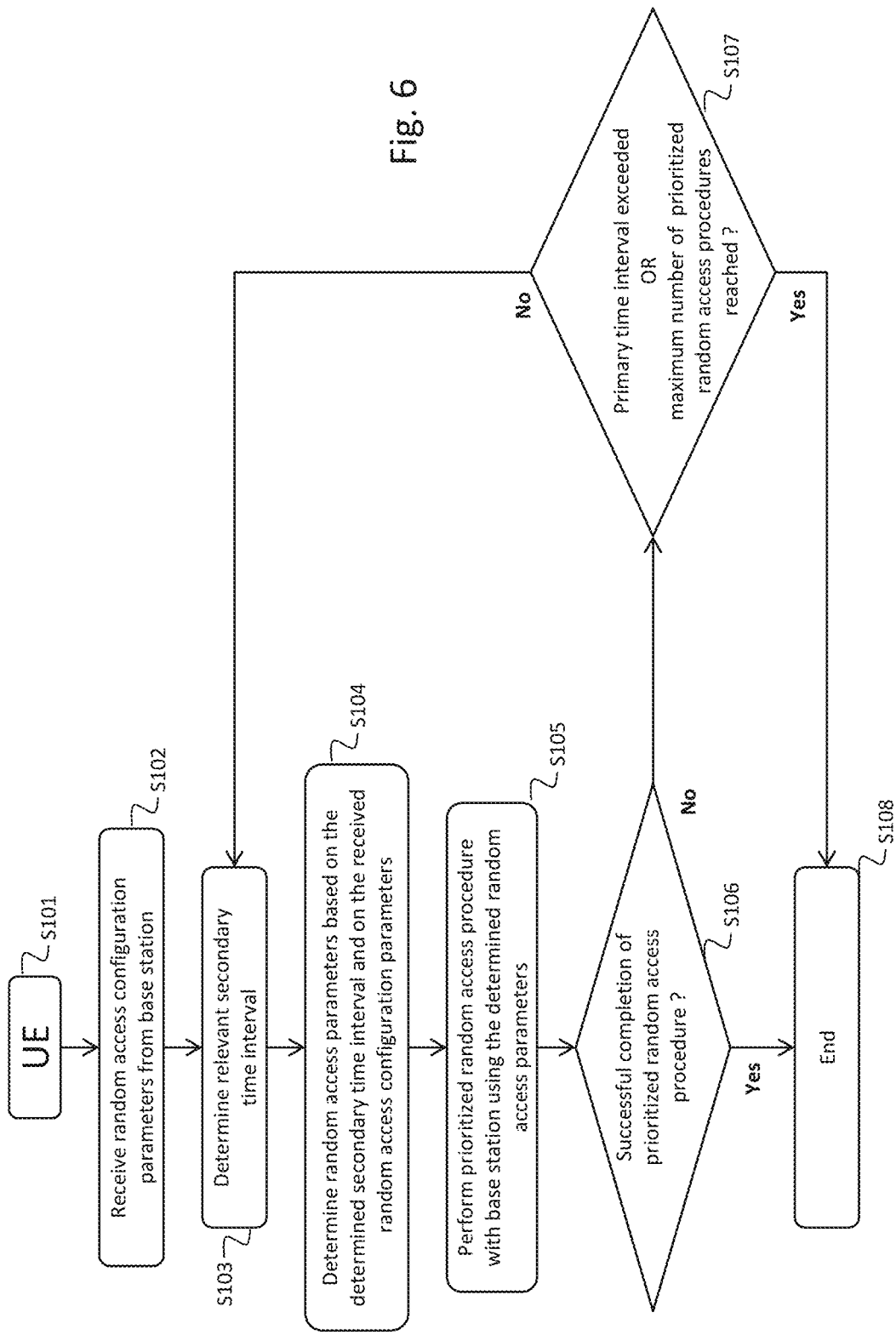
FIG. 6 is a sequence diagram of the UE behavior according to the first embodiment.

A simplified and exemplary illustration of the UE behavior for participating in the improved prioritized random access procedure of this embodiment and variants thereof as explained herein is presented in FIG. 6 in form of a sequence diagram. Only for the sake of facilitating illustration, it is exemplarily assumed that the prioritization of the random access procedure is based on the random access event alone.

As shown in FIG. 6, the UE starts at step S101. It is proceeded to step S102 where the UE receives random access configuration parameters from the base station. The UE proceeds at step S103 with determining the relevant secondary time interval which is to be considered for the following step. Specifically, the UE determines the secondary time interval at which the UE intends to perform the RACH procedure. According to step S104, the UE determines random access parameters based on the determined secondary time interval as well as on the received random access configuration parameters. The UE then performs in step S105 a prioritized random access procedure with the base station using the determined random access parameters. The UE then decides, in step S106, as to whether the prioritized random access procedure has been successful.

If it has been decided that the prioritized random access procedure was successful, the process is terminated in step S108. If it is decided that the prioritized random access procedure was not successful, the UE decides, in step S107, as to whether a primary time interval has already exceeded or a maximum number of prioritized random access procedures reached. If this time interval has expired or if the maximum number of prioritized random access procedures is reached, the process terminates at step S108. If, however, the primary time interval is not exceeded, that UE again performs step S103 to determine the current secondary time interval. Steps S104 and S105 are again performed until it is again checked in step S106 as to whether the prioritized random access procedure has been successfully completed. According to the embodiment, the primary time interval comprises a plurality of secondary time intervals.

According to an example of the embodiment, the UE repeatedly performs the prioritized random access procedure during a handover using contention-based random access or during a contention-based beam failure recovery. According to a further example of the embodiment, the UE informs the base station about a beam failure recovery failure or handover failure, if the primary time interval has lapsed without having completed a RACH procedure successfully.

An advantage of introducing a priority time interval or introducing maximum RACH attempt counter is to restrict the time duration for which prioritized random access procedures can be performed by the UE and to thereby reduce RACH congestion. In order to determine the start of the priority time interval and whether the priority time interval has lapsed, the UE may, e.g., comprise a priority timer that is set by the value of the priority time interval as, for instance, indicated by the random access configuration parameters. Alternatively, the UE may comprise a primary counter, wherein a lapse of the priority time interval is determined, if the primary counter exceeds the preset value of the priority time interval. According to a further example, the length of the priority time interval is comprised in the random access configuration parameters that are received from the base station. Alternatively, according to a further example, the length of the priority time interval may be defined by the UE.

An advantage of introducing a plurality of secondary time intervals to be comprised within the primary time interval for performing prioritized random access procedures is that in each of the subsequent secondary time intervals the random access parameters can be flexibly changed/adjusted. By means of setting different random access parameters for each secondary time interval, it is possible to more efficiently handle the power values random access parameters such as used for the RACH attempts so as to prevent undesirable interferences to other UEs. In order to determine the start of the respective secondary time interval and whether the respective secondary time interval has lapsed, the UE may, e.g., comprise anyone with a fixed a secondary timer that is set by the preset value of the respective secondary time interval. Alternatively, the UE may comprise a secondary counter, wherein a lapse of the respective secondary time interval is determined, if the secondary counter exceeds the preset value of the respective secondary time interval. According to a further example, the length of the respective secondary time interval is comprised in the random access configuration parameters that are received from the base station. Alternatively, according to a further example, the length of the respective secondary time interval may be defined and known to the UE.

According to a further variation of the embodiment, the UE may comprise a RACH attempt counter for counting the RACH attempts already made within the primary time interval.

According to an example of the embodiment, the received random access configuration parameters comprise an initial configuration of power ramping and back-off parameter. In a further variation, the random access configuration parameters comprise an initial power value, a power ramping step size value that indicates the increment of power to be used based on the transmission power of the preceding RACH attempt as well as a back-off parameter. In a further variation, the random access configuration parameters only comprise a single power value that indicates the increment of power to be used based on the transmission power of the preceding RACH attempt. In a further variation, the random access configuration parameters only comprise a plurality of power ramping size values that indicate the transmission power to be used for a respective one of the plurality of RACH attempts. In a further variation, the power ramping step size values comprised in the random access configuration parameters may increase with each passed secondary time interval, or may decrease with each passed secondary time interval, or may indicate to keep the power used for transmitting the RACH attempts constant. In a further variation of the embodiment, the random access configuration parameters further comprise the maximum number of RACH attempts to be considered by the UE.

According to a still further variation of the embodiment, once the primary timer expired or the RACH attempt counter has reached the maximum number of RACH attempts, the random access configuration parameters are not valid anymore and the UE will not perform any further RACH attempt. The UE then will inform upper layers about a failed beam failure recovery.

With regards to the back-off parameter, if comprised in the random access configuration parameters, same may exemplarily be a single back-off value that indicates a constant waiting time between two RACH attempts, i.e., the same back-off value is to be considered throughout all secondary time intervals of the complete primary time interval. Alternatively, the back-off parameter may exemplarily comprise multiple back-off values that respectively indicate a waiting time between two RACH attempts for different secondary time intervals. According to an example, the multiple back-off values change with each passed secondary time interval. According to a further example, the multiple back-off values successively decrease with each passed secondary time interval. According to a still further example, the multiple back-off values successively increase with each passed secondary time interval. According to a still further example, the multiple back-off values are a predetermined combination of increasing values, decreasing values and constant values to be used throughout the plurality of secondary time intervals.

According to a further example of the embodiment, the UE periodically sends a channel state information, CSI, report and/or a measurement report to the base station.

In general, a CSI (Channel State Information) report as well as the measurement report are generated by the UE and include information on the quality of UE channels, such as downlink channels with current serving gNB and/or neighbor gNBs.

In LTE, there are several type of channel measurements that can be performed by the UE, two of which will be presented in the following. For instance, the UE may be configured to provide measurements reports, including one or more of the following types:

Intra-frequency measurements: measurements at the downlink carrier frequency(ies) of the serving cell(s).

Inter-frequency measurements: measurements at frequencies that differ from any of the downlink carrier frequency(ies) of the serving cell(s)

Inter-RAT measurements of NR frequencies

Inter-RAT measurements of UTRA frequencies

Inter-RAT measurements of GERAN frequencies

Inter-RAT measurements of CDMA2000 HRPD or CDMA2000 1×RTT or WLAN frequencies

CBR measurements

The UE reports measurement information in accordance with the measurement configuration as provided by E-UTRAN. E-UTRAN provides the measurement configuration applicable for a UE in RRC_CONNECTED by means of dedicated signaling, i.e., using the RRCConnectionReconfiguration or RRCConnectionResume message. The measurement reports can be either triggered periodically or based on single events. More detailed information in said respect can be obtained from the 3GPP TS 36.331, v15.0.1, section 5.5, incorporated herein by reference. No corresponding measurements have yet been defined for 5G NR, although it can be expected that there will be in the future. For the present, it may thus be exemplarily assumed that measurement report, similar or the same as available for LTE, can be used in the context of the present embodiment.

On the other hand, there are already agreements with respect to UE procedures for reporting channel state information. 3GPP TS 38.214 v15.0.0 section 5.2, which is incorporated herein by reference, for instance defines that the CSI report may consist of Channel Quality Indicator (CQI), precoding matrix indicator (PMI), CSI-RS resource indicator (CRI), strongest layer indication (SLI), rank indication (RI) and/or and L1-RSRP. The time and frequency resources that can be used by the UE to report CSI are controlled by the gNB.

Figure 7:
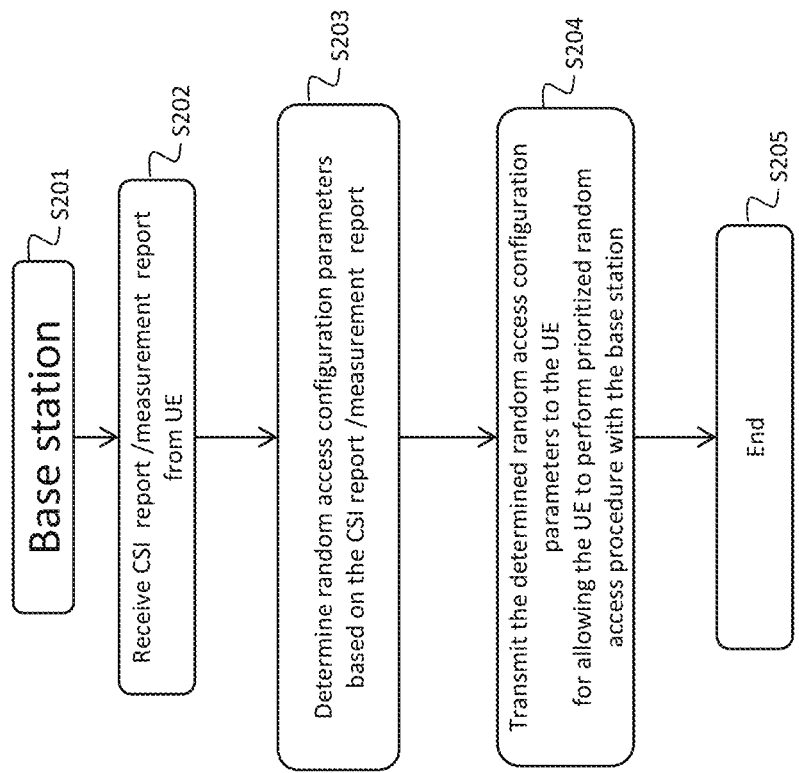
FIG. 7 is a sequence diagram of the base station behavior according to the first embodiment.

A simplified and exemplary illustration of the base station behavior for participating in the improved prioritized random access procedure of this embodiment and variants thereof as explained herein is presented in FIG. 7 in form of a sequence diagram.

As shown in FIG. 7, the base station starts at step S201. In step S202, the base station receives a CSI report or a measurement report from the UE. Alternatively, the base station may receive both, a CSI report and a measurement report from the UE. It is proceeded with determining, in step S203, random access configuration parameters based on the CSI report/measurement report. Subsequently, the base station proceeds step S204, wherein the determined random access configuration parameters are transmitted to the UE for allowing the UE to perform prioritized random access procedure with base station. Thereafter, the process is ended in step S205.

According to an example of the embodiment, the determined random access configuration parameters comprise an initial configuration of power ramping and back-off parameter. In a further variation, the random access configuration parameters comprise an initial power value, a power ramping step size value that indicates to the UE the increment of power to be used based on the transmission power of the preceding RACH attempt as well as a back-off parameter. With regards to the back-off parameter, same may exemplarily be a single back-off value that indicates a constant waiting time between two RACH attempts. Alternatively, the back-off parameter may exemplarily be multiple back-off values that respectively indicate a waiting time between two RACH attempts for different secondary time intervals.

According to a further example of the embodiment, the random access configuration parameters determined by the base station further comprise the value for the primary time interval to be considered by the UE. The random access configuration parameters may additionally comprise one value that indicates a length of time interval to be considered for each secondary time interval. Thereby, the secondary time intervals have the same time length.

Alternatively, the random access configuration parameters may additionally comprise a plurality of values, each value indicating the respective length of one secondary time interval. Thereby, the lengths of the secondary time intervals may vary throughout the plurality of secondary time intervals.

With regards to the number of secondary time intervals, same is configurable by the base station and could be indicated in the random access configuration parameters, according to another exemplary implementation of the embodiment. Thereby, the maximum number of secondary time intervals may, e.g., correspond to the number of available power ramping step size values but is not limited thereto. For example, if the base station configures five different power ramping step size values, the random access configuration parameters to be transmitted to the UE also specify five secondary time intervals within the primary time interval so as to have a one-to-one association between the power ramping step size and the secondary time interval. In a variation of this example, the random access configuration parameters to be transmitted to the UE may specify only one, two, three, or four secondary time intervals within the primary time interval.

In an exemplary implementation of the embodiment, the base station transmits the random access configuration parameters to the UE via dedicated signaling using the RRC layer or the MAC layer or DCI.

According to a further exemplary implementation of the embodiment, the base station may instruct the UE via the random access configuration parameters to use a RACH attempt as a trigger for the secondary timer/secondary counter to start a new secondary interval, e.g., with an interval length as comprised in the random access configuration parameters. In a further variation, the base station may instruct the UE via the random access configuration parameters to use a predetermined RACH attempts for starting the secondary timer/secondary counter. For example, the base station may instruct the UE to start the secondary time interval after each third RACH attempt. According to another example, the base station may instruct the UE via the random access configuration parameters to use the third, eighth and tenth RACH attempt for starting a new secondary time interval.

Adapting the lengths of the secondary time intervals as well as the number of secondary time intervals within the primary time interval advantageously allows to suitably react on the channel situation. For instance, a reduction of the lengths of the secondary time intervals together with lower power ramping step size values in the beginning of the prioritized RACH procedure advantageously allows a finer increase in power value in the beginning of the prioritized RACH procedure when the UE still has sufficient time to achieve a successful RACH procedure. As the lapsed time of the primary time interval of the RACH procedure increases, the power ramping step size values increase so as to allow a much coarser increase in transmission power when the UE has less time remaining to successfully complete a RACH procedure.

According to a further example of the embodiment, the base station receives, for a contention-based beam failure recovery case, the CSI report and/or the measurement report periodically sent by the UE to the base station. Based on a comparison of the received CSI report/measurement report and a previous CSI report/measurement report, the base station may decide as to whether new/updated random access configuration parameters are required and need to be provided to the UE. If it has been decided that new/updated random access configuration parameters are required, the base station determines same and transmits same to the UE. According to an exemplary implementation, the base station may configure a large power ramping step size, if the channel quality is low. Otherwise, it may configure a small power ramping step size, if the channel quality is high.

Figure 8:
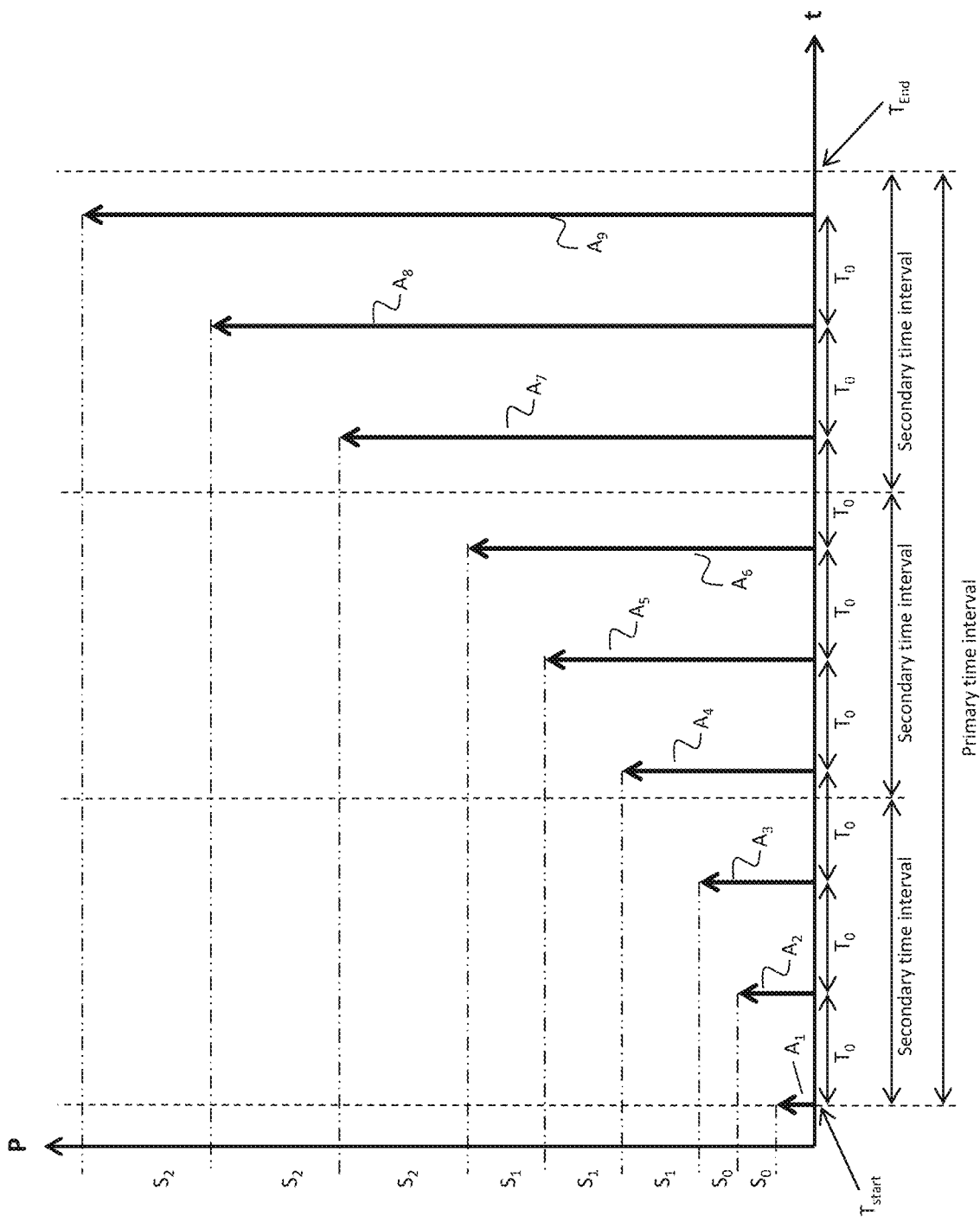
FIG. 8 illustrates RACH attempts by a UE in a prioritized RACH procedure according to a variation of the first embodiment.

FIG. 8 illustrates RACH attempts by a UE in a prioritized RACH procedure according to one example of the first embodiment. The prioritized RACH attempts are performed within the primary time interval as illustrated in the figure. In FIG. 8, several RACH attempts $A_1$ to $A_9$ are illustrated as vertical arrows. According to this example, only one single back-off value $T_0$ is signaled by the gNB to the UE within the random access configuration parameters. Hence, the back-off time, which is indicated as time period $T_0$, is kept constant throughout the entire primary time interval. Hence, all RACH attempts are timed with the same waiting period in-between, irrespective of the secondary time interval in which the RACH attempt occurs.

More specifically, the primary time interval starts at point in time $T_{start}$ with an initial RACH attempt $A_1$ with an initial transmission power $P_0$. $P_0$ in this exemplary illustration is, e.g., an initial power value as instructed by the gNB in the random access configuration parameters. If the RACH attempt is not successful, which means that the RACH procedure is not completed, the UE proceeds with a second RACH attempt $A_2$ upon the back-off time $T_0$ has lapsed. The transmission power used for the second RACH attempt $A_2$ is an initial power value with an added power ramping step size value $S_0$, i.e., $P_0+S_0$. If still no completion of the RACH procedure was possible, the UE then proceeds with a third RACH attempt $A_3$ after a further back-off time $T_0$ has lapsed. Analogously to the second RACH attempt $A_2$, the transmission power used for the third RACH attempt $A_3$ equals to the transmission power used for attempt $A_2$ plus the power ramping step size value $S_0$. In this regard, the power ramping step size value $S_0$ is only used for the first secondary time interval throughout the plurality of secondary time intervals within the superordinate "primary time interval".

As can be seen from FIG. 8, the first secondary time interval ends before the time period $T_0$ subsequent to the third RACH attempt $A_3$ expires. Upon expiry of the first secondary time interval, the UE then considers a new power ramping step size value $S_1$, as it was signaled by the gNB in the random access configuration parameters. As a consequence, upon expiry of the back-off time $T_0$ subsequent to the third RACH attempt $A_3$, the UE performs a fourth RACH attempt $A_4$ with the transmission power used for RACH attempt $A_3$ plus the new power ramping step size value $S_1$. Throughout the entire second secondary time interval, all further RACH attempts ($A_5$ and $A_6$, according to the exemplary illustration) are transmitted with a transmission power of the respective preceding RACH attempt incremented by the power ramping step size value $S_1$.

Upon transition to the third secondary time interval of the illustration in FIG. 8, it is apparent that the transmission power used for RACH attempt $A_7$ is the transmission power used for RACH attempt $A_6$ incremented by the power ramping step size value $S_2$, which is valid for the third secondary time interval. With regards to RACH attempts $A_8$ and $A_9$, which would occur if still no RACH procedure could successfully be completed, the respective transmission powers are again respectively increased by the power ramping step size value $S_2$ (which is valid for the third secondary time interval) based on the preceding RACH attempt.

The RACH attempt $A_9$ is the last one in the third secondary time interval and also the last one within the superordinate primary time interval so that the entire prioritized random access procedure terminates at point in time $T_{end}$.

It is to be noted that the existence of three secondary time intervals within the primary time interval, as shown in FIG. 8, is merely an example and that the primary time interval could have a different number of secondary time intervals. According to an exemplary embodiment, at least two secondary time intervals are provided within the primary time interval.

Figure 9:
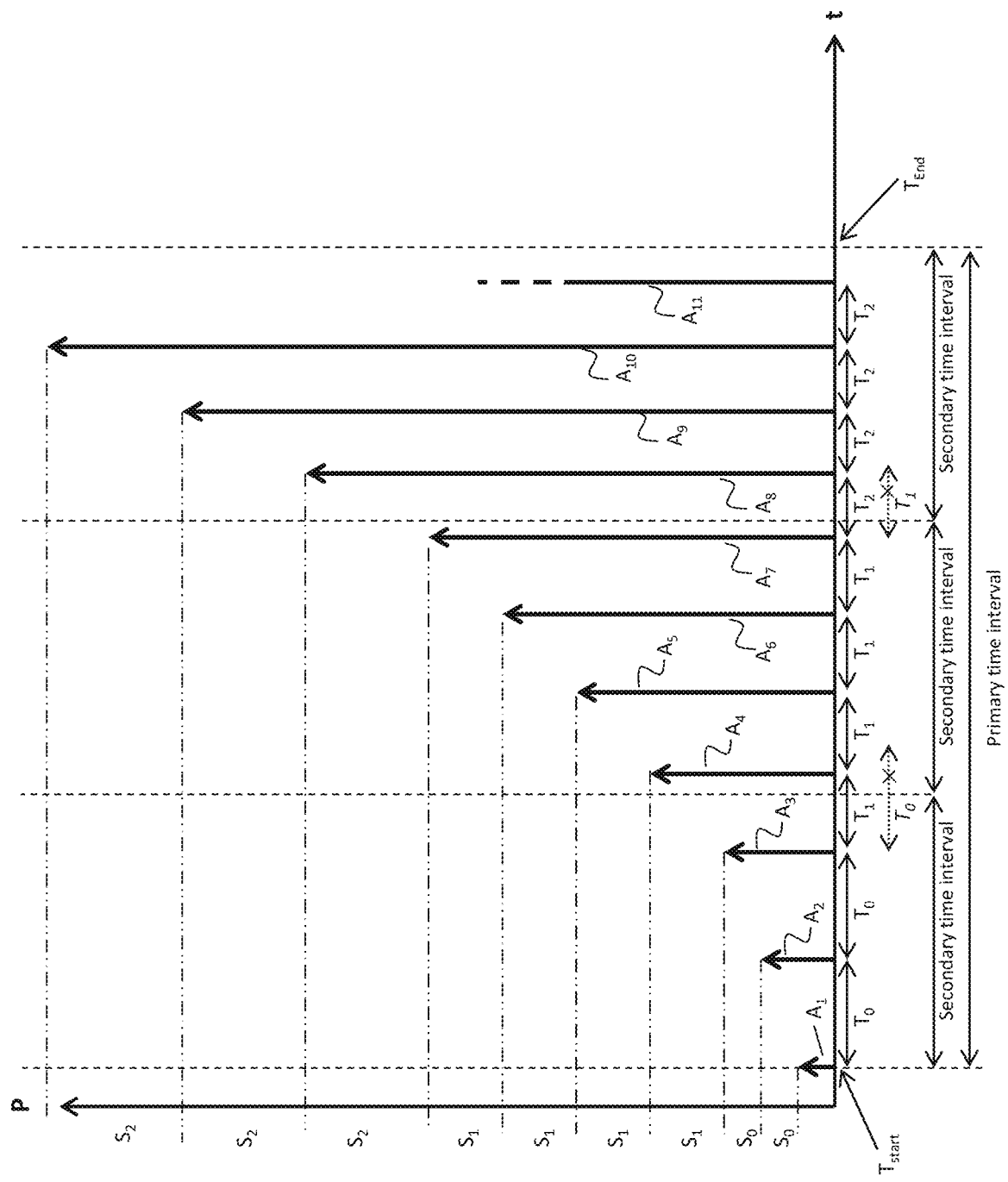
FIG. 9 illustrates RACH attempts by a UE in a prioritized RACH procedure according to further variation of the first embodiment.

FIG. 9 illustrates RACH attempts by a UE in a prioritized RACH procedure according to a variation of the first embodiment.

According to this variation of the first embodiment, for each secondary time interval a different back-off value is valid. As can be seen from FIG. 9, back-off value $T_0$ is valid for the first secondary time interval, back-off value $T_1$ is valid for the second secondary time interval, whereas back-off value $T_2$ is valid for the third secondary time interval.

According to this variation of the embodiment, the respective length of the back-off time periods becomes shorter with each passed secondary time interval. In other words, back-off time period $T_1$ is shorter than back-off time period $T_0$, whereas back-off time period $T_2$ is shorter than back-off time period $T_1$. However, this is merely an example so that according to further examples, a back-off time period at a later secondary time interval can also be identical to the initial back-off time period $T_0$ or identical to any other back-off time period. Also, a back-off time period at a later secondary time interval can also be longer than a back-off time period of a preceding secondary time interval.

As can be seen from the illustration in FIG. 9, the first secondary time interval switches to the second secondary time interval between RACH attempt $A_3$ and RACH attempt $A_4$. This figure illustrates the first option how the UE deals with a situation where the back-off time shifts between two subsequent secondary time intervals. According to the option exemplarily shown in FIG. 9, the UE checks, at the end of the first secondary time interval as to whether the new back-off time $T_1$ valid for the subsequent second secondary time interval has already been lapsed since RACH attempt $A_3$ failed. As illustrated, the UE decides to wait until back-off time period $T_1$ has passed counting from the point in time of the RACH attempt $A_3$. Upon expiry of this back-off time period $T_1$, a new RACH attempt $A_4$ is performed.

Should, however, back-off time period $T_1$ already be expired at the point in time of end of the first secondary time interval, the UE could send RACH attempt $A_4$ right at the beginning of the second secondary time interval. This possibility is, however, not illustrated in FIG. 9.

Further, according to the case illustrated in FIG. 9, the UE disregards the back-off time period $T_0$ after having performed RACH attempt $A_3$.

Likewise, the second secondary time interval switches to the third secondary time interval between RACH attempt $A_7$ and RACH attempt $A_8$. According to the option exemplarily shown in FIG. 9, the UE checks, at the end of the second secondary time interval as to whether the new back-off time $T_2$ valid for the subsequent third secondary time interval has already lapsed since RACH attempt $A_7$ failed. As illustrated, the UE decides to wait until back-off time period $T_2$ has passed counting from the point in time of the RACH attempt $A_7$. Upon expiry of this back-off time period $T_2$, a new RACH attempt $A_8$ is performed. The UE disregards in this case the back-off time period $T_1$ after having performed RACH attempt $A_7$. As already explained in connection with FIG. 8, the RACH attempts shown in FIG. 9 are terminated upon expiry of the superordinate primary time interval so that the entire prioritized random access procedure terminates at point in time $T_{end}$.

Figure 10:
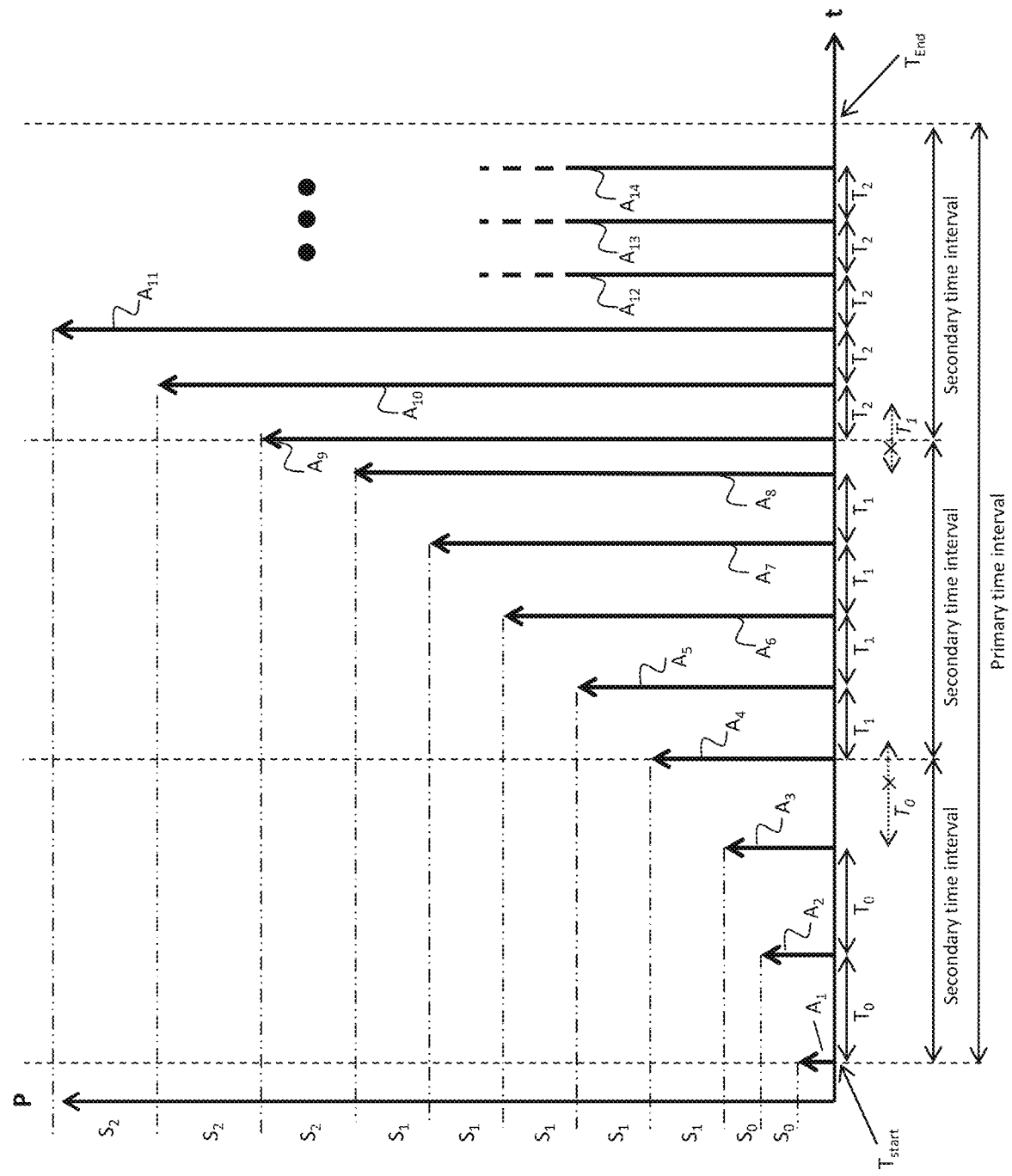
FIG. 10 illustrates RACH attempts by a UE in a prioritized RACH procedure according to a further variation of the first embodiment.

FIG. 10 illustrates RACH attempts by a UE in a prioritized RACH procedure according to a further variation of the first embodiment.

According to this variation of the first embodiment, and in analogy to the explanations given for FIG. 9, for each secondary time interval a different back-off value is valid. As can be seen from FIG. 10, back-off value $T_0$ is valid for the first secondary time interval, back-off value $T_1$ is valid for the second secondary time interval, whereas back-off value $T_2$ is valid for the third secondary time interval.

According to this variation of the embodiment, and in analogy to the explanations given for FIG. 9, the respective length of the back-off time periods becomes shorter with each passed secondary time interval. In other words, back-off time period $T_1$ is shorter than back-off time period $T_0$, whereas back-off time period $T_2$ is shorter than back-off time period $T_1$. However, this is merely an example so that according to further examples, a back-off time period at a later secondary time interval can also be identical to the initial back-off time period $T_0$ or identical to any other back-off time period. Also, a back-off time period at a later secondary time interval can also be longer than a back-off time period of a preceding secondary time interval.

As can be seen from the illustration in FIG. 10, the first secondary time interval switches to the second secondary time interval before lapse of back-off time period $T_0$ after RACH attempt $A_3$. This figure illustrates a further option (compared to the option illustrated in FIG. 9) how the UE deals with a situation where the back-off time shifts between two subsequent secondary time intervals. According to the option exemplarily shown in FIG. 10, the UE immediately performs RACH attempt $A_4$ right at the beginning of the second secondary time interval in any case, irrespective of whether the new valid back-off time $T_1$ has already lapsed after the transmission of RACH attempt $A_3$ or not.

Hence, according to the case illustrated in FIG. 10, the UE disregards the back-off time period $T_0$ after having performed RACH attempt $A_3$.

Likewise, the second secondary time interval switches to the third secondary time interval before lapse of back-off time period $T_1$ after RACH attempt $A_8$. As illustrated and according to the option exemplarily shown in FIG. 10, the UE immediately transmits RACH attempt $A_9$ right at the beginning of the third secondary time interval in any case, irrespective of whether the new valid back-off time $T_2$ has already lapsed after the transmission of RACH attempt $A_8$ or not.

Hence, according to the case illustrated in FIG. 10, the UE disregards the back-off time period $T_1$ after having performed RACH attempt $A_8$.

As can further be seen from FIG. 10 and in comparison to the option described in connection with FIG. 9, the time interval between RACH attempt $A_8$ and RACH attempt $A_9$ may be any time interval length between interval length 0 and back-off time length $T_1$.

As already explained in connection with FIG. 8, the RACH attempts shown in FIG. 10 are terminated upon expiry of the superordinate primary time interval so that the entire prioritized random access procedure terminates at point in time $T_{end}$.

Figure 11:
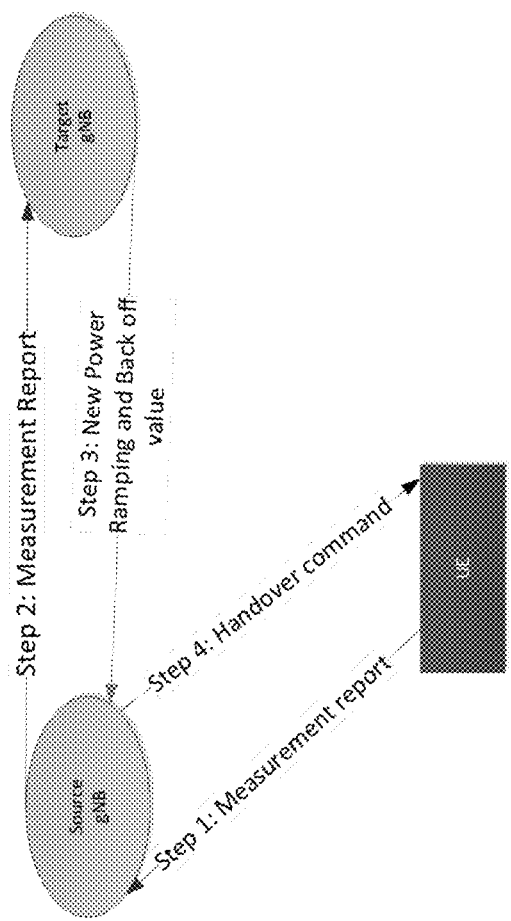
FIG. 11 illustrates a handover scenario between the UE/source gNB and UE/target gNB according to the first embodiment.

FIG. 11 illustrates a contention-based handover scenario between the UE/source gNB and UE/target gNB according to the first embodiment.

According to this exemplary scenario, the base station acts as a source base station (source gNB). In Step 1, a measurement report is received from the UE. The source gNB will then forward, in Step 2, the measurement report to a target gNB.

Upon the target gNB receiving the measurement report from the source gNB, the target gNB will configure new target-cell related random access configuration parameters for the UE to be used for the RACH attempts with the target gNB. According to an example, these new target-cell related random access configuration parameters may comprise at least one of a new initial power value, a new power ramping step size value, a new plurality of power step size values, a new single back-off value, new multiple back-off values, new indications for the lengths of the primary and secondary time interval, and a maximum number of RACH attempts for being considered by the UE.

In Step 3, the source gNB then receives the new target-cell related random access configuration parameters from the target gNB.

According to Step 4, the source gNB then forwards the new target-cell related random access configuration parameters to the UE so that the UE can consider them when performing RACH procedures with the target gNB.

According to this exemplary contention-based handover scenario, once the primary timer expired or the RACH attempt counter has reached the maximum number of RACH attempts, the random access configuration parameters are not valid anymore and the UE will not perform any further RACH attempt. The UE then will inform upper layers about a failed handover procedure.

Figure 12:
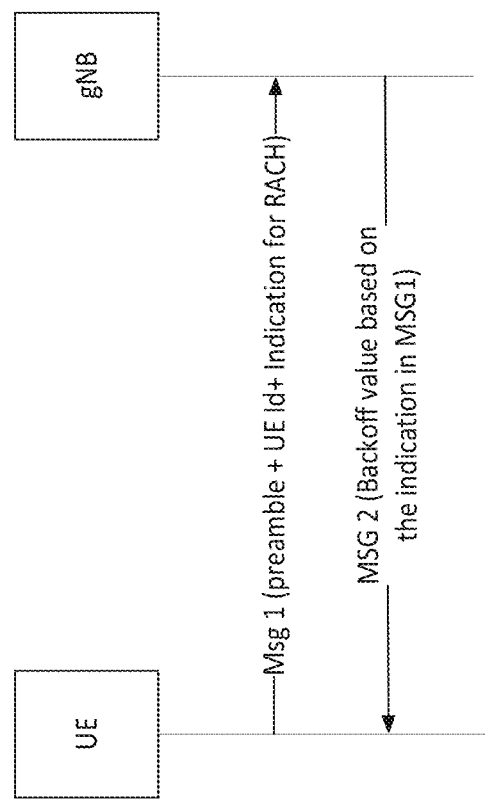
FIG. 12 illustrates a scenario with the gNB providing the UE with back-off value during a 2-step RACH procedure according a further variation of the first embodiment.

FIG. 12 illustrates a scenario with the gNB providing the UE with back-off value during a 2-step RACH procedure according a further variation of the first embodiment.

This figure relates to a case where the base station does not configure a back-off value with the random access configuration parameters. According to this illustrated case, the UE uses the initial power value (which is indicated by the base station in the dedicated message, the previously received random access configuration parameters) for Message 1 of the 2-step RACH procedure as shown in FIG. 12. According to this embodiment, the UE transmits in Message 1 (which is a combination of Message 1 and 3 as used during a 4-step RACH procedure) a RACH preamble, a UE identification as well as an indication whether the UE uses prioritized or normal RACH Procedure. By this way, the base station is aware of whether the UE uses prioritized or normal RACH procedure.

Upon reception of Message 1 as shown in FIG. 12, the base station responds to the UE with Message 2 that may include a back-off value based on the "normal/prioritized RACH procedure"-indication provided by the UE in Message 1. In this regard, the base station configures a back-off value in Message 2 only after having received an indication from the UE in Message 1 whether it performs prioritized or normal RACH procedure. For instance, if prioritized RACH procedure is indicated in Message 1, the base station may determine and indicate a shorter back-off value in Message 2 to the UE so as to allow a shorter interval between the several RACH attempts, thereby advantageously increasing the possibility of a successful RACH procedure.

Embodiment 2

In the second embodiment, a further implementation of a prioritized random access procedure is described, as an alternative to the procedure provided in Embodiment 1.

According to Embodiment 2, the random access configuration parameters which are transmitted from the base station to the UE via dedicated signaling do not indicate the existence of secondary time intervals. Hence, according to this embodiment, only a primary time interval is indicated and used for the prioritized RACH procedure.

In a first example of this embodiment, the random access configuration parameters specify a fixed set of power values to be used for the respective RACH attempts. In other words, no power ramping step size value needs to be indicated in the configuration parameters. That means, each RACH attempt may be transmitted with a transmission power as configured by the fixed set of power values. According to an example, the RACH procedure starts with lowest power value at point in time $T_{start}$ of the primary time interval. The power value increases subsequently on every failed RACH attempt, until the primary time interval expires or until the maximum number of RACH procedures is reached or until a RACH procedure has successfully been completed.

In addition to the above first example of this embodiment, the random access configuration parameters may additionally indicate a fixed back-off value to be used by the UE when performing the several RACH attempts. As an alternative, the fixed back-off value may not be signaled in the random access configuration parameters, but be predefined by the UE itself.

In addition to the above first example of this embodiment, the random access configuration parameters may, as an alternative, additionally define a fixed set of back-off values, the highest back-off value configured at the start of the prioritized RACH procedure at point in time $T_{start}$, whereafter the back-off value decreases subsequently on every failed RACH attempt, until the primary time interval expires or until the maximum number of RACH procedures is reached or until a RACH procedure has successfully been completed.

Further, as a second example of this embodiment, the random access configuration parameters specify an initial power value and one power ramping step size value to be used for the respective RACH attempts, wherein the initial power value and the power ramping step size value is chosen by the base station. According to an example, the power value is increased by the fixed step size at every failed RACH attempt until the primary time interval expires or until the maximum number of RACH procedures is reached or until a RACH procedure has successfully been completed.

In addition to the above second example of this embodiment, the random access configuration parameters may additionally indicate a fixed back-off value to be used by the UE when performing the several RACH attempts. As an alternative, the fixed back-off value may not be signaled in the random access configuration parameters, but be predefined by the UE itself.

Further Aspects

According to a first aspect, a user equipment is provided comprising a receiver, which in operation, receives random access configuration parameters from a base station that controls a radio cell of a mobile communication system in which the user equipment is located. The user equipment further comprises a processor, which in operation, controls to repeatedly perform a prioritized random access procedure with the base station, based on the received random access configuration parameters, for a time period up to an end of a primary time interval or until a maximum number of RACH procedures is reached or until successful completion of the prioritized random access procedure with the base station. The primary time interval comprises a plurality of secondary time intervals. The processor, when controlling to repeatedly perform the prioritized random access procedure, determines random access parameters, which are valid for the duration of the respective secondary time interval in which the respective at least one prioritized random access procedure is performed, based on the received random access configuration parameters and depending on the respective secondary time interval. The user equipment further comprises a transmitter, which in operation, transmits messages of the respective prioritized random access procedure using the determined valid random access parameters.

According to a second aspect provided in addition to the first aspect, the random access configuration parameters include:
- an initial power value to be used for an initial prioritized random access procedure; and
- a plurality of power ramping step size values, each indicating an increment to the preceding power value to be used for each prioritized random access procedure performed within the respective secondary time interval.

According to a third aspect provided in addition to the second aspect, the power ramping step size values increase with each passed secondary time interval.

According to a fourth aspect provided in addition to any of the first to third aspects, the random access configuration parameters further include a single back-off value indicating a waiting time between two subsequent prioritized random access procedures, wherein the single back-off value is applicable to all secondary time intervals.

According to a fifth aspect provided in addition to any of the first to third aspects, the random access configuration parameters include multiple back-off values, each indicating the respective waiting time between two subsequent prioritized random access procedures within the respective secondary time interval:
- optionally, wherein the multiple back-off values change with each passed secondary time interval;
- optionally, wherein the multiple back-off values decrease with each passed secondary time interval;
- optionally, wherein the multiple back-off values increase with each passed secondary time interval; and
- optionally, wherein the multiple back-off values are a predetermined combination of increasing values, decreasing values and constant values to be used throughout the plurality of secondary time intervals.

According to a sixth aspect provided in addition to any of the first to fifth aspects, the processor, which in operation, further controls, for each primary time interval, a first timer or first counter for determining whether the primary time interval has lapsed.

According to a seventh aspect provided in addition to any of the first to sixth aspects, the processor, which in operation, further controls, for each secondary time interval, a second timer or second counter for determining whether the secondary time interval has lapsed.

According to an eighth aspect provided in addition to any of the first to seventh aspects, the receiver, which in operation, receives the random access configuration parameters from the base station via dedicated signaling using the radio resource control, RRC, layer or the media access control, MAC, layer, or in downlink control information.

According to a ninth aspect provided in addition to any of the first to eighth aspects, the processor, which in operation, controls to repeatedly perform the prioritized random access procedure during a handover using contention-based random access or during a contention-based beam failure recovery.

According to a tenth aspect provided in addition to any of the first to ninth aspects, the processor, which in operation, controls to inform the base station about a beam failure recovery failure or handover failure, if the primary time interval has lapsed.

According to a eleventh aspect provided in addition to any of the second to tenth aspects, the number of secondary time intervals is configurable by the base station and further comprised in the random access configuration parameters; and wherein the maximum number of secondary time intervals corresponds with the number of available power ramping step size values.

According to a twelfth aspect, a base station is provided that controls a radio cell of a mobile communication system in which a user equipment is located, wherein the base station comprises a receiver, which in operation, receives a channel state information, CSI, report and/or a measurement report from the user equipment. The base station further comprises a processor, which in operation, determines, based on the received CSI report and/or the received measurement report, random access configuration parameters to be used by the user equipment for repeatedly performing a prioritized random access procedure with the base station within a primary time interval which comprises a plurality of secondary time intervals. The base station further comprises a transmitter, which in operation, transmits the determined random access configuration parameters to the user equipment such that the user equipment is able to determine, based on the random access configuration parameters and depending on the respective secondary time interval, random access parameters, which are valid for the duration of the respective secondary time interval in which the respective at least one prioritized random access procedure is performed.

According to a thirteenth aspect provided in addition to the twelfth aspect, the random access configuration parameters include:
- an initial power value to be used by the user equipment for an initial prioritized random access procedure; and
- a plurality of power ramping step size values, each indicating an increment to the preceding power value to be used by the user equipment for each prioritized random access procedure performed within a respective secondary time interval, a plurality of which is comprised in the primary time interval.

According to a fourteenth aspect provided in addition to the thirteenth aspect, the power ramping step size values increase with each passed secondary time interval.

According to a fifteenth aspect provided in addition to any of the twelfth to fourteenth aspects, the random access configuration parameters further include a single back-off value indicating a waiting time between two subsequent prioritized random access procedures, wherein the single back-off value is applicable to all secondary time intervals.

According to a sixteenth aspect provided in addition to any of the twelfth to fourteenth aspects, the random access configuration parameters include multiple back-off values, each indicating the respective waiting time between two subsequent prioritized random access procedures within the respective secondary time interval:
- optionally, wherein the multiple back-off values change with each passed secondary time interval;
- optionally, wherein the multiple back-off values decrease with each passed secondary time interval;
- optionally, wherein the multiple back-off values increase with each passed secondary time interval; and
- optionally, wherein the multiple back-off values are a predetermined combination of increasing values, decreasing values and constant values to be used throughout the plurality of secondary time intervals.

According to a seventeenth aspect provided in addition to any of the twelfth to sixteenth aspects, the random access configuration parameters further include the number of secondary time intervals; and wherein the maximum number of secondary time intervals corresponds with the number of available power ramping step size values.

According to a eighteenth aspect provided in addition to any of the thirteenth to seventeenth aspects, the processor, which in operation, determines a large power ramping step size value in case the received CSI report and/or the received measurement report indicates a low channel quality; and wherein the processor, which in operation, determines a small power ramping step size value in case the received CSI report and/or the received measurement report indicates a high channel quality.

According to a nineteenth aspect provided in addition to any of the twelfth to seventeenth aspects, the processor, which in operation, controls to transmit the random access configuration parameters to the user equipment via dedicated signaling using the radio resource control, RRC, layer or the media access control, MAC, layer, or in downlink control information.

According to a twentieth aspect provided in addition to any of the twelfth to eighteenth aspects, the processor, which in operation, determines if updated random access configuration parameters have to be transmitted to the user equipment based on a comparison of the received CSI report with a previously received CSI report; and wherein the transmitter, which in operation, transmits the updated random access configuration parameters to the user equipment in case the processor has determined the updated random access configuration parameters.

According to a twenty-first aspect provided in addition to any of the twelfth to nineteenth aspects, the base station acts as a source base station; and
- wherein the receiver, which in operation, receives a measurement report from the user equipment,
- wherein the processor, which in operation, controls to forward the received measurement report to a target base station,
- wherein the receiver, which in operation, receives target-cell related random access configuration parameters from the target base station to be used by the user equipment for performing prioritized random access procedure in a target cell, and
- wherein the transmitter, which in operation, forwards the received measurement report to the target base station and forwards the target-cell related random access configuration parameters to the user equipment.

Hardware and Software Implementation of the Present Disclosure

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC (integrated circuit), a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A user equipment, comprising:
a receiver, which in operation, receives random access configuration parameters from a base station that controls a radio cell of a mobile communication system in which the user equipment is located; and
a processor, which in operation, controls to repeatedly perform a prioritized random access procedure with the base station, based on the received random access configuration parameters, for a time period up to an end of a primary time interval or until a maximum number of RACH procedures is reached or until successful completion of the prioritized random access procedure with the base station,
wherein the primary time interval comprises a plurality of secondary time intervals;
wherein the processor, when controlling to repeatedly perform the prioritized random access procedure, determines random access parameters, which are valid for the duration of the respective secondary time interval in which the respective at least one prioritized random access procedure is performed, based on the received random access configuration parameters and depending on the respective secondary time interval; and
a transmitter, which in operation, transmits messages of the respective prioritized random access procedure using the determined valid random access parameters;
wherein the random access configuration parameters include:
an initial power value to be used by the user equipment for an initial prioritized random access procedure; and
a plurality of power ramping step size values, each indicating an increment to the preceding power value to be used by the user equipment for each prioritized random access procedure performed within a respective secondary time interval; and
wherein the receiver, in operation:
receives a large power ramping step size value in case the user equipment reports a low channel quality; and
receives a small power ramping step size value in case the user equipment reports a high channel quality.

2. The user equipment according to claim 1, wherein the power ramping step size values increase with each passed secondary time interval.

3. The user equipment according to claim 1, wherein the random access configuration parameters further include a single back-off value indicating a waiting time between two subsequent prioritized random access procedures, wherein the single back-off value is applicable to all secondary time intervals.

4. The user equipment according to claim 1, wherein the random access configuration parameters include multiple back-off values, each indicating the respective waiting time between two subsequent prioritized random access procedures within the respective secondary time interval;
wherein the multiple back-off values change with each passed secondary time interval; or
wherein the multiple back-off values decrease with each passed secondary time interval; or
wherein the multiple back-off values increase with each passed secondary time interval; or
wherein the multiple back-off values are a predetermined combination of increasing values, decreasing values and constant values to be used throughout the plurality of secondary time intervals.

5. The user equipment according to claim 1, wherein the processor, which in operation, controls to inform the base station about a beam failure recovery failure or handover failure, if the primary time interval has lapsed.

6. The user equipment according to claim 1, wherein the number of secondary time intervals is configurable by the base station and further comprised in the random access configuration parameters, wherein the maximum number of secondary time intervals corresponds with the number of available power ramping step size values.

7. A base station that controls a radio cell of a mobile communication system in which a user equipment is located, the base station comprising:
a receiver, which in operation, receives a channel state information, CSI, report and/or a measurement report from the user equipment;
a processor, which in operation, determines, based on the received CSI report and/or the received measurement report, random access configuration parameters to be used by the user equipment for repeatedly performing a prioritized random access procedure with the base station within a primary time interval which comprises a plurality of secondary time intervals; and
a transmitter, which in operation, transmits the determined random access configuration parameters to the user equipment such that the user equipment is able to determine, based on the random access configuration parameters and depending on the respective secondary time interval, random access parameters, which are valid for the duration of the respective secondary time interval in which the respective at least one prioritized random access procedure is performed;
wherein the random access configuration parameters include:
an initial power value to be used by the user equipment for an initial prioritized random access procedure; and
a plurality of power ramping step size values, each indicating an increment to the preceding power value to be used by the user equipment for each prioritized random access procedure performed within a respective secondary time interval; and
wherein the processor, in operation:
determines a large power ramping step size value in case the received CSI report and/or the received measurement report indicates a low channel quality; and
determines a small power ramping step size value in case the received CSI report and/or the received measurement report indicates a high channel quality.

8. The base station according to claim 7, wherein the power ramping step size values increase with each passed secondary time interval.

9. The base station according to claim 7, wherein the random access configuration parameters further include a single back-off value indicating a waiting time between two subsequent prioritized random access procedures, wherein the single back-off value is applicable to all secondary time intervals.

10. The base station according to claim 7, wherein the random access configuration parameters include multiple back-off values, each indicating the respective waiting time between two subsequent prioritized random access procedures within the respective secondary time interval;
wherein the multiple back-off values change with each passed secondary time interval; or wherein the multiple back-off values decrease with each passed secondary time interval; or wherein the multiple back-off values increase with each passed secondary time interval; or wherein the multiple back-off values are a predetermined combination of increasing values, decreasing values and constant values to be used throughout the plurality of secondary time intervals.

11. The base station according to claim 7, wherein the number of secondary time intervals is configurable by the base station and further comprised in the random access configuration parameters, wherein the maximum number of secondary time intervals corresponds with the number of available power ramping step size values.

12. The base station according to claim 7, wherein the processor, in operation, determines if updated random access configuration parameters have to be transmitted to the user equipment based on a comparison of the received CSI report with a previously received CSI report; and wherein the transmitter, in operation, transmits the updated random access configuration parameters to the user equipment in case the processor has determined the updated random access configuration parameters.

13. The base station according to claim 7, wherein the base station acts as a source base station;

wherein the receiver, in operation, receives a measurement report from the user equipment;

wherein the processor, in operation, controls to forward the received measurement report to a target base station;

wherein the receiver, in operation, receives target-cell related random access configuration parameters from the target base station to be used by the user equipment for performing prioritized random access procedure in a target cell; and wherein the transmitter, in operation, forwards the received measurement report to the target base station and forwards the target-cell related random access configuration parameters to the user equipment.

* * * * *

UNITED STATES PATENT AND TRADEMARK OFFICE
CERTIFICATE OF CORRECTION

PATENT NO. : 11,405,952 B2
APPLICATION NO. : 16/991384
DATED : August 2, 2022
INVENTOR(S) : Shah et al.

Page 1 of 1

It is certified that error appears in the above-identified patent and that said Letters Patent is hereby corrected as shown below:

In the Claims

Column 26, Claim 5, Line 4:
"processor, which in operation," should read: -- processor, in operation, --.

Signed and Sealed this
Twentieth Day of September, 2022

Katherine Kelly Vidal
*Director of the United States Patent and Trademark Office*